United States Patent
Cozma et al.

(10) Patent No.: US 12,535,957 B2
(45) Date of Patent: Jan. 27, 2026

(54) WRITING A CONFIGURATION FILE TO FLASH MEMORY ON A SERVER

(71) Applicant: Lenovo Enterprise Solutions (Singapore) Pte Ltd., Singapore (SG)

(72) Inventors: Alexandru Cozma, Bucharest (RO); Fred Allison Bower, III, Durham, NC (US); Jeffery J Van Heuklon, Rochester, MN (US); Shubhadip Deb, Cary, NC (US)

(*) Notice: Subject to any disclaimer, the term of this patent is extended or adjusted under 35 U.S.C. 154(b) by 0 days.

(21) Appl. No.: 18/744,844

(22) Filed: Jun. 17, 2024

(65) Prior Publication Data

US 2025/0383795 A1    Dec. 18, 2025

(51) Int. Cl.
*G06F 3/06* (2006.01)

(52) U.S. Cl.
CPC .......... *G06F 3/0629* (2013.01); *G06F 3/0604* (2013.01); *G06F 3/0679* (2013.01)

(58) Field of Classification Search
CPC ..... G06F 3/0629; G06F 3/0604; G06F 3/0679
USPC ....................................................... 709/220
See application file for complete search history.

(56) References Cited

U.S. PATENT DOCUMENTS

2009/0083449 A1* 3/2009 Mashinsky ........... G06F 16/273
                                                                710/8
2016/0364232 A1* 12/2016 Moeller ................. G06F 8/658

* cited by examiner

*Primary Examiner* — Adil Ocak
(74) *Attorney, Agent, or Firm* — Jeffrey L. Streets (57) ABSTRACT

A method includes temporarily connecting a mobile computing device to a service input/output port of a server, wherein the service input/output port provides access to a flash memory, and wherein the mobile computing device runs a mobile application. The mobile application causes the mobile computing device to write a configuration file, operating system and firmware to the flash memory through the service input/output port. A system management controller on the server reads the configuration file from the flash memory with the server in a standby power state or power on state, wherein the system management controller has access to the flash memory within the server in the standby power state and a power on state. The system management controller uses the configuration file and installs the firmware and the operating system on the server with the server in the power on state.

20 Claims, 5 Drawing Sheets

WRITING A CONFIGURATION FILE TO FLASH MEMORY ON A SERVER

BACKGROUND

The present disclosure relates to methods of providing configuration data to a server.

BACKGROUND OF THE RELATED ART

A brand-new server is usually provisioned by putting it in a server rack, powering on the server, accessing the system management controller and then configuring the server via the system management controller. The provisioning steps are complicated and require a significant amount of manual work after the server has been installed in the server rack.

A configuration process is a set of tasks that make a device ready to operate in a specific environment. For example, configuration may include loading the appropriate software and making sure that the software can run. Network server configuration refers to the process of setting up and configuring the hardware and software of a network server to get it up and running. This may involve multiple steps such as configuring the operating system, network protocols, security settings, user access, shared resources, and network services.

BRIEF SUMMARY

Some embodiments provide a method comprising temporarily connecting a mobile computing device to a service input/output port of a server, wherein the service input/output port provides access to a flash memory within the server, and wherein the mobile computing device runs a mobile application. The method further comprises the mobile application causing the mobile computing device to write a configuration file, operating system and firmware to the flash memory through the service input/output port. The method also comprises a system management controller on the server reading the configuration file from the flash memory within the server, wherein the system management controller has access to the flash memory with the server in the standby power state and a power on state. Still further, the method comprises the system management controller using the configuration file and installing the firmware and the operating system on the server with the server in the power on state.

DETAILED DESCRIPTION

Some embodiments provide a method comprising temporarily connecting a mobile computing device to a service input/output port of a server, wherein the service input/output port provides access to a flash memory within the server, and wherein the mobile computing device runs a mobile application. The method further comprises the mobile application causing the mobile computing device to write a configuration file, operating system and/or firmware to the flash memory through the service input/output port. The method also comprises a system management controller on the server reading the configuration file from the flash memory within the server, wherein the system management controller has access to the flash memory with the server in the standby power state and a power on state. Still further, the method comprises the system management controller using the configuration file and installing the firmware and the operating system on the server with the server in the power on state.

Non-limiting examples of the mobile computing device include a smartphone, tablet computer or notebook computer. The mobile computing device must have a communication port for connecting to the service input/output port of the server. For example, the service input/output port of the server may be a service Universal Serial Bus (USB) port, and a USB cable may be used to connect the mobile computing device to the service USB port. The communication port of the mobile computing device may be a USB port, such as a USB C port, or any other port form factor, such as Apple's Lightning port. The cable may supply power from the mobile computing device to the flash memory over the cable and through the input/output port even if the server is in an unplugged state to support reading from and/or writing to the flash memory. Furthermore, the mobile computing device includes a processor and memory to support running the mobile application (also referred to as an "app"). The mobile application includes a set of program instructions that may be executed by the processor to cause the processor to perform various operations according to one or more of the disclosed embodiments.

A server is a computer that provides information or services to other computers (i.e., "clients") over a computer network. Although the architecture of a server may vary widely, a typical server will include a system management controller, such as a baseboard management controller (BMC). A system management controller manages the interface between system-management software, such as a system management application, and platform hardware on the server. In other words, the system management controller forms an out-of-band computer that monitors and controls aspects of the operation of the main server hardware and software, such as the central processing units and memory. One example of a BMC is Lenovo's XClarity Controller (XCC). Embodiments may refer to a server that is being provisioned and configured, but one or more servers may also be used to host the system management application and/or form part of the cloud computing environment where the centralized management platform may be hosted. The server has three possible power states: (1) an UNPLUGGED state, (2) a STANDBY POWER state where the server is plugged in, but turned/powered off, such that power is provided to the system management controller but not the CPU, and (3) a POWER ON state in which the server is fully operational.

The shared flash memory is a non-volatile memory device that is installed on the motherboard of the server and connected to both the service USB port and to the system management controller. The system management controller can read the flash memory at any time that the system management controller has power, including the standby power state and the power on state. Embodiments may be utilized to simplify the creation of provisioning plans for devices prior to installation at a final location. The on-board flash memory that is shared between the system management controller and the USB Service port may be used to provision and configure the server using the default system management controller (XCC) firmware configuration that is installed by the hardware manufacturer at the factory and without requiring rack installation or powering on the server.

A service input/output port, such as a service USB port, is configured so that the service input/output port is connected to the flash memory. When the system is not connected to any power source, the flash memory may receive power over the service input/output port from the mobile computing device that is connected by a cable to the service input/output port and may communicate with the mobile computing device (i.e., a smartphone or laptop computer) over the same cable. However, any time that the server is plugged in to a power source and standby power is being supplied to the system management controller, the flash memory will typically utilize the standby power. The service input/output port is wired with connectivity into the system management controller but is still connected to the standard input/output bus of the server as well. So, the service input/output port operates nominally as any other input/output port (such as a USB port) but has additional capability that is used specifically for service functions like configuration and service log retrieval. A non-limiting example of a service input/output port is the Lenovo Front Panel USB Port to Management. During manufacturing and any intermediate configuration stops in the supply chain, data about the system configuration and state may be written into this flash memory for use in the process of provisioning the server. Note that this data may be written into the flash memory using a computing device connected to the service input/output port by a cable while the server is not yet connected to standby power. Once the server is plugged into a power source such that standby power is supplied to the server, data that has been written to the flash memory via the input/output port will be visible to the baseboard management controller.

In some embodiments, the method may further comprise the mobile application retrieving the configuration file, operating system and firmware from a centralized management platform. The mobile application may retrieve these files at any time, including before the mobile application is connected to the service input/output port of the server or even after the mobile application is connected to the service input/output port. The mobile computing device that runs the mobile application is able to communicate with the centralized management platform over one or more networks, including a wide area network such as the Internet.

The centralized management platform may be a cloud-based centralized management platform, such as Lenovo's XClarity® One (XC1), which is similar in functional scope to Lenovo's XClarity® Orchestrator. The XClarity® Orchestrator (LXCO) software solution orchestrates multiple instances of a system management application, such as Lenovo's XClarity® Administrator (XCA). Lenovo's XClarity® Administrator is a centralized resource management solution that is aimed at reducing complexity, speeding response, and enhancing the availability of Lenovo® server systems and solutions. The centralized management platform provides centralized monitoring, management, provisioning and analytics for environments having a large number of managed devices, such as the managed servers. The one or more system management applications monitor and control various aspects of operation of the managed servers and report data to the centralized management platform.

In some embodiments, the centralized management platform may be XClarity® One (XC1), which is accessible via the XClarity® One Portal (XC1 Portal) over a wide area network. Furthermore, the system management application may be XClarity® Hub (XC1 Hub) which is similar in functional scope to XClarity® Administrator but updated to work with the XClarity® One Portal. XC1 Hub is an aggregator of connections from multiple managed servers that are typically in a logical or physical proximity to one another. The aggregation of connections performed by the XC1 Hub improves both security and scalability of the solution. Each of the managed servers may include an XClarity® Controller that serves as the system management controller. Lenovo's XClarity® Controller (XCC) is the system management controller that implements the baseboard management controller (BMC) function for Lenovo servers, such as each of a plurality of managed servers.

In some embodiments, the configuration file, operating system and/or firmware that the mobile application is writing into the flash memory through the service input/output port may be included in a JavaScript Object Notation (JSON) Web Token. A JSON Web Token (JWT) is a standard or specification for creating data with optional digital signature and including payload that holds JSON that asserts some number of claims. For example, the JWT may be accompanied by a digital signature that is created using a centralized management platform private key. The system management controller (XCC) may store and use with a public encryption or signature key (XC1 Portal public key) that is provided by, or on behalf of, the centralized management platform (XC1 Portal) and the centralized management platform may store and use a private encryption or signature key (XC1 Portal private key) that forms a key pair with the public encryption or signature key (XC1 Port public key). Accordingly, the system management controller may use the centralized management platform public key that was previously provided to the system management controller to decrypt the digital signature and verify that the JavaScript Object Notation web token (JWT) was authored by the centralized management platform. The system management controller may receive the centralized management platform public key even if the server is in an unplugged state, such as while the server is in the manufacturing facility, somewhere along the supply chain, or at any time prior to installing the server at a target location.

In some embodiments, the method may further comprise the mobile application handling the exchange of credentials between the system management controller on the server and a system management application while the server is in an unplugged state, wherein the system management application will monitor the operation of the server after the server has been installed in an operative location. Since the mobile application runs on the mobile computing device that can communicate with both the system management controller on the server via the service input/output port and a system management application via a network connection, the mobile application is able to exchange the credentials of these two entities. Providing the exchange of credentials that support communication between the system management controller and the system management application while the server is still in an unplugged state means that this aspect of configuring the server to operate in the computing environment at the target location can be completed before the server even arrives or is installed in the target location. In some embodiments, the server may require little or no additional provisioning or configuring at the operative location (target location) when the server is installed. Accordingly, the system management controller may be able to communicate with the system management application as soon as the server is plugged in to receive standby power. In addition to the exchange of credentials, the mobile application may provide the system management controller with a configuration file that includes a security token, credentials, and/or network configuration that enables communication with the system management application.

In some embodiments, the configuration file may identify a first Internet Protocol address for a system management application and the method may further comprise the system management controller using the first Internet Protocol address to communicate with the system management application after the server has been installed in an operative location. A server may be considered to be installed when it is both plugged in to a power source (i.e., in a standby power state or a power on state) and has a connection to a network. For example, a network interface controller of the server may also receive standby power to enable the system management controller to have network communications with the system management application, which may be running on a system management server.

In some embodiments, the configuration file may identify a second Internet Protocol address for the cloud-based centralized management platform and the method may further comprise the system management controller using the second Internet Protocol address to communicate with the cloud-based centralized management platform after the server has been installed in an operative location.

In some embodiments, the configuration file may provide a certified configuration that includes a firmware level and configuration settings for use with a specific operating system and/or application(s). A certified configuration is a combination of software and settings that have been tested under various conditions and determined to operate in a stable and proper manner. Accordingly, the testing entity may "certify" that this combination of software and settings are approved for use on a particular type of hardware. Installing a certified configuration poses fewer threats to operability and security of the system than installing random combinations of software and settings.

In some embodiments, the mobile application may cause the mobile computing device to read configuration data that was already stored on the flash memory before the mobile computing device was connected to the service input/output port of the server. The mobile application may then take various actions responsive to the configuration data that was read from the flash memory. In one example, the mobile application may determine whether any or all of the configuration data is appropriate for the intended role of the server at a target location. If some of the configuration data is not appropriate, then that portion of the configuration data may be deleted or overwritten. If some portion of the configuration data is appropriate, for example to support use of hardware components within the server, then that portion of the configuration data may be maintained. Furthermore, if appropriate configuration data indicates a need to download a particular file, such as firmware code or a device driver, then the mobile application may retrieve the one or more files from the centralized management platform and write the one or more files to the flash memory. In one option, if the configuration data or file present on the flash memory is included in a configuration file that is intended to be written onto the flash memory, then it is possible to keep that configuration data or file on the flash memory rather than writing a separate copy of the configuration data or file.

In some embodiments, the method may further comprise the mobile application causing the mobile computing device to remove a configuration file, operating system, and/or firmware that was already stored on the flash memory when the mobile computing device was initially connected to the service input/output port of the server. In other embodiments, the operation of the mobile application causing the mobile computing device to write a configuration file, operating system and firmware to the flash memory through the service input/output port may further include overwriting a default configuration file stored on the flash memory. Any previously stored operating system, firmware and/or application may also be overwritten.

In some embodiments, it may be advantageous to write the configuration file, operating system, and/or firmware to the flash memory while the server is in an unpowered state. In such embodiments, the flash memory may receive power from the device hosting the mobile application via the cable connected to the input/output port of the server.

Some embodiments provide the technical benefit of pre-configuring a server that is just "out of the box" without powering on the server. Embodiments provide the technical benefit of pre-provisioning a server with the base system management controller configuration by overwriting the factory configuration before the server is even plugged in to a power source and there is not even any standby power available to the system management controller.

Some embodiments provide the technical benefit of making a configuration file, operating system and firmware available to the server from the cloud-based system management portal, thus making it unnecessary for the server manufacturer to pre-install such files. Optionally, a specification identifying the software images that should be installed on the server may be stored in the flash memory, where such specification may be stored by the factory, intermediate stops in the supply chain, and/or the mobile application. Furthermore, any or all authorized participants can make modifications to the configuration of the server without actually unboxing the server or plugging in the server. The mobile computing device may then deliver the identified images to the server once the server has been unboxed to allow a connection between the mobile computing device running the mobile application and the service input/output port, but without requiring the server be connected to a power source.

In some embodiments where files have been written into the flash memory at the factory or intermediate steps prior to final installation, the mobile application may inventory and certify those files. The mobile application may read the files stored on the flash memory to perform this certification. For example, the mobile application may compare the stored files to an approved list of files or enable the centralized management platform to compare the stored files to an approved list of files.

Some embodiments provide a computer program product comprising a non-volatile computer readable medium and program instructions embodied therein, the program instructions being configured to be executable by a processor to cause the processor to perform one or more operations of the methods described herein. For example, the computer program product may include program instructions for performing the operations of the system management controller, the mobile application, the system management application and/or the centralized management platform.

Figure 1:
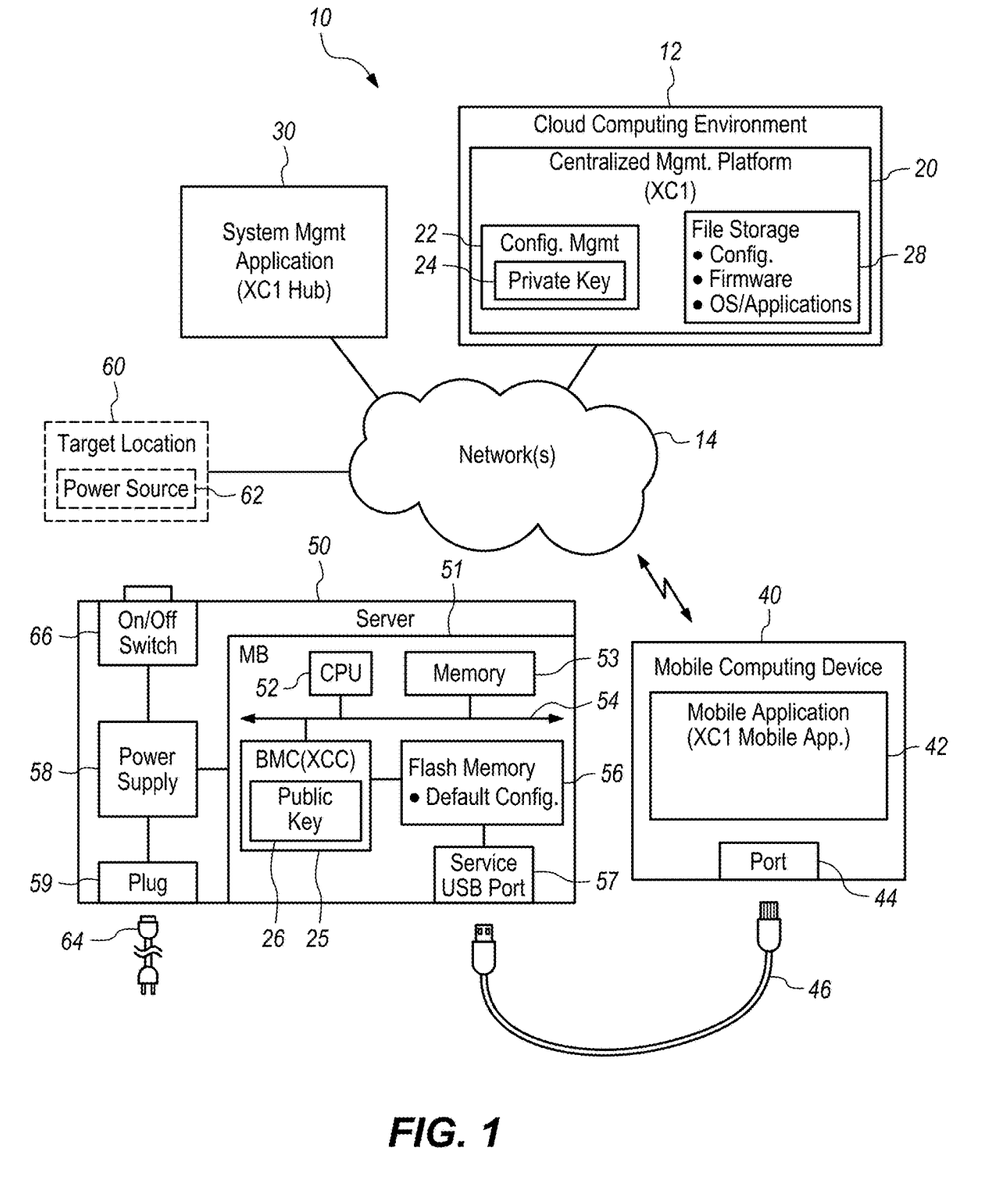
FIG. 1 is a diagram of a system in which some embodiments may be implemented.

FIG. 1 is a diagram of a system 10 in which embodiments may be implemented. The system includes a centralized management platform 20, a system management application 30, a mobile computing device 40, and a server 50 that is to be provisioned and configured for use in a system at a target location 60. The centralized management platform 20 may be hosted in a cloud computing environment 12 and made accessible to other entities over one or more network(s) 14, including the Internet. The centralized management platform 20, which may be implemented by Lenovo's XClarity One (XC1), may include a configuration management logic module 22 with a private key 24 that has been generated as part of a public/private key pair with the public key 26. The centralized management platform 20 may also include or have access to file storage 28 that stores configuration files, firmware, operating systems and applications. Any one or more of the configuration files, firmware, operating systems and applications may be used to provision and configure the server 50.

The system management application 30 may run on a server (not shown) with access to the network(s) 14 to facilitate monitoring and control over the operation of servers in the system at the target location 60. Embodiments may configure the server 50 so that the server 50 is able to communicate with the system management application 30 once the server is installed in the target location 60. Furthermore, the system management application 30 may report some or all of the server operating data to the centralized management platform 20.

The server 50 includes a motherboard (MB) 51 including a central processing unit (CPU) 52, memory 53 and a system bus 54 that couples the CPU, memory and other components. A baseboard management controller (BMC) 55, which may be an XClarity Controller (XCC), has access to the system bus 54 as well as a flash memory device 56. Accordingly, the BMC 55 may read files stored on the flash memory 56 and use those files to configure the server and install firmware, an operating system, and perhaps one or more applications. However, the content of the flash memory 56 may be modified by external devices that connect to the service input/output port 57, such as a service USB port. Optionally, data or files may be stored or modified on the flash memory 56 even while the server is in an unplugged state using power supplied by the mobile computing device 40. Note that the flash memory 56 is illustrated as storing a "default configuration file", which may have been stored during manufacturing without any knowledge or regard for the operating environment in which the server 50 would eventually be installed.

The server 50 includes a power supply 58 that may receive alternating current from a power source via a power plug 59. Once the server 50 is delivered to the target location 60, the server 50 may be connected to the power source 62 via a power cord 64. However, the server 50 is not currently connected to any power source as indicated by the power cord 64 being disconnected. When the server 50 initially becomes connected to a power source, the server 50 may enter a standby power state in which power is supplied to the BMC 55, but not the entire server 50. For example, the CPU 52 and the memory 53 will not receive power until the on/off switch 66 has been toggled to an "On" position and the server 50 enters a power on state.

The mobile computing device 40 runs a mobile application 42 that performs operations according to various embodiments described herein. The mobile computing device 40, such as a smartphone, tablet computer or notebook computer, also includes a port 44 for selectively connecting to a communication cable 46, such as a USB cable. Accordingly, the cable 46 may be connected between the port 44 of the mobile computing device 40 and the service input/output port 57 of the server 50 to allow the mobile application 42 to access the flash memory 56 as if the flash memory were an external non-volatile storage device. In fact, connecting the cable 46 between the port 44 of the mobile computing device 40 and the service input/output port 57 will supply power to the flash memory 56 when the server 50 is in an unplugged state (as shown) so that the mobile computing device may communicate with the flash memory 56. When the server 50 is connected to a power source to enter the standby state and when the server is powered on to enter a power on state, the service input/output port 57 will not allow an external device, such as the mobile computing device 40, to power the flash memory 56.

According to various embodiments, the mobile computing device 40 may be used to modify the contents of the flash memory 56 whether or not the server 50 is connected to a power source. In the present non-limiting example, the server 50 has not yet been delivered to the target location 60 and has not yet been provisioned or configured for operation in the target location 60. However, the mobile application 42 may communicate with the centralized management platform 20 to obtain the files that are needed to provision and configure the server 50. In some implementations, these provisioning and configuring operations may be performed in a convenient location before the server is sent off to be installed in the target location 60. This is particularly beneficial if the target location 60 is a remote location or a location where the server 50 is one of a small number of servers to be installed at the target location 60. For example, the server 50 may be implemented as an edge computer near certain sensors or equipment in a distributed computing environment, such that it is inefficient for a technician to travel to the target location 60 to provision and configure the single server.

Figure 2:
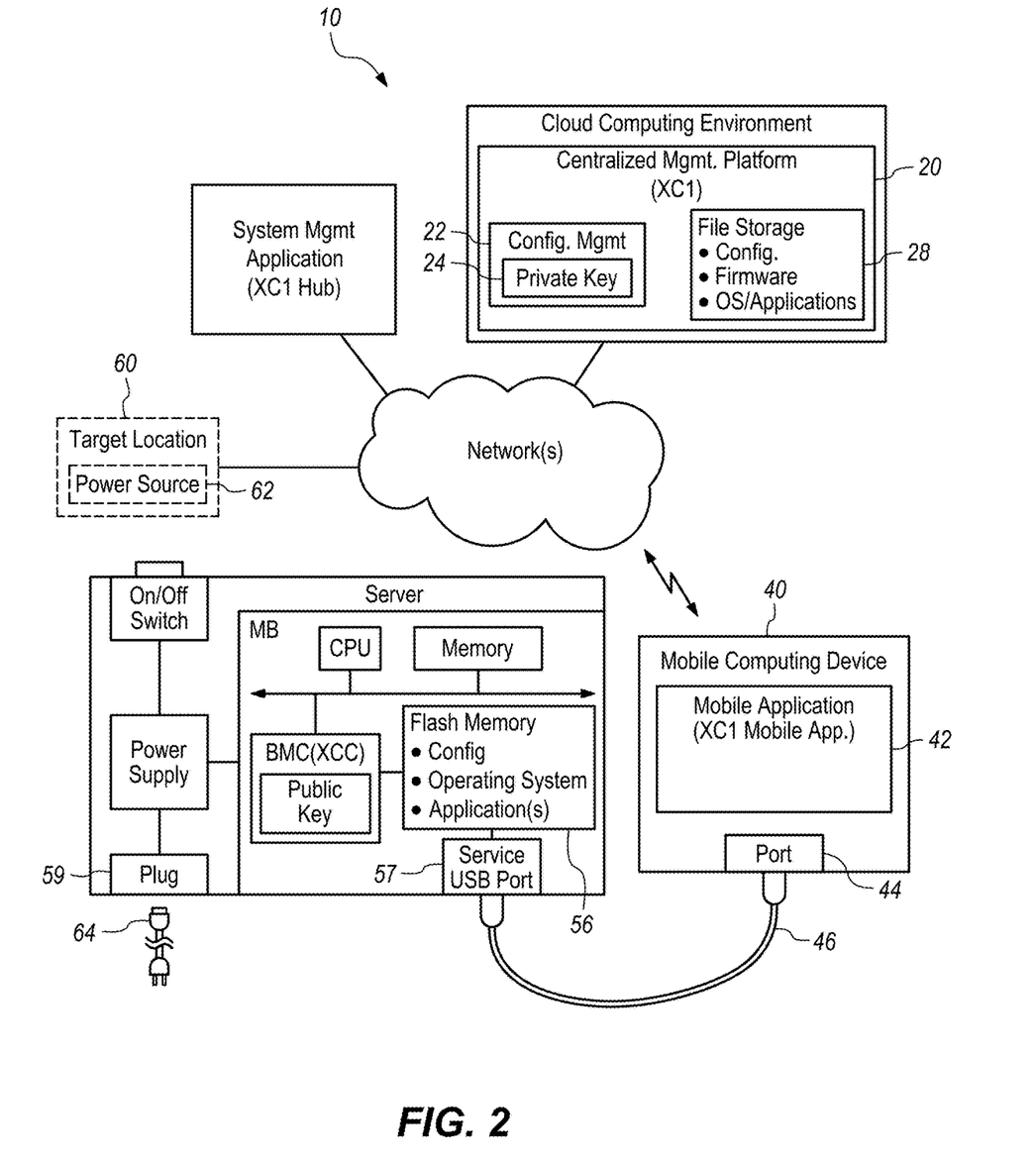
FIG. 2 is a diagram of the system of FIG. 1 with the server in an unplugged state and a mobile computing device connected to the service input/output port of the server.

FIG. 2 is a diagram of the system 10 of FIG. 1 with the server 50 in an unplugged state and the mobile computing device 40 temporarily connected to the service input/output port 57 of the server 50 using the communication cable 46, such as a USB cable. Since the server 50 is unplugged (see cable 64 and plug 59), the mobile computing device 40 provides the power to activate and access the flash memory 56 as if the flash memory was an external USB drive. However, if the server 50 were plugged in, the flash memory 56 may be powered with standby power yet the mobile computing device 40 would still be able to read and write data with respect to the flash memory.

The mobile application 42 retrieves configuration data, firmware, an operating system and/or applications from the centralized management platform 20. For example, the "configuration data" may be included in a JWT (JSON Web Token) that has been prepared by the configuration management module 22 and signed with the private key 24. In other words, a digital signature is provided along with the configuration data, where the digital signature is computed by a signing algorithm using both the content of the message (i.e., the configuration data from the file storage 28 that is included in the JWT) and the private key 24.

The mobile application 42 may remove or delete any configuration files, operating system (OS), and firmware (FW), that may have been previously created and stored in the flash memory, such as the default configuration (see flash memory 56 in FIG. 1). The flash memory will not typically be preloaded with the necessary configuration files, operating systems or firmware, since there isn't enough storage to accommodate all of the possible options and servers. Further, any files installed in manufacturing risk becoming outdated while sitting in the box (during storage or shipment prior to provisioning). Accordingly, the mobile application may obtain the necessary files from external sources, such as the centralized management platform 20, and then write those files to the flash memory 56.

The server will typically be shipped from the factory with firmware but without an operating system (OS) or configuration file. These files are typically not provided to the server prior to shipment since the factory (manufacturing facility) will typically not know the identity of the OS needed by the server or the appropriate content of a configuration file ("config file") necessary to customize the server for operation in a deployed location. Although the server is typically shipped from the factory with firmware, firmware versions are frequently updated such that the firmware version residing on the server when the server is shipped should be assumed to require updating. Furthermore, updating the firmware is recommended to maintain good security hygiene and also to meet best practices recommendations for the specific OS being loaded. In one option, the configuration file may include a certified configuration that includes a firmware level and configuration settings that are tailored to a specific OS and platform stack above the OS.

Accordingly, embodiments may include the mobile application writing the updated firmware, the configuration file, the operating system and any additional platform stack above the operating system to the flash memory. Optionally, the mobile application may either write the actual firmware, configuration file, operating system and/or stack to the flash memory or write identifying information about the firmware, configuration file, operating system and/or stack so that these files can be downloaded when needed.

The configuration data may include data that the server would need to be operational plus additional data that would assist in getting the server securely connected to a system management application (XC1 Hub) 30. The system management application 30 will be responsible for ongoing lifecycle management of the server 50 after the mobile device connection is terminated. However, the configuration data that the mobile application 42 stored in the flash memory 56 may include various aspects of configuration, such as aspects related to both the internal configuration of the server as well as the server's integration into its external environment at the target location 60. Accordingly, the configuration data may include security tokens, credentials, network configuration, etc. Although FIG. 2 illustrates the capability of the mobile computing device 40 to communicate with the flash memory 56 even with the server 50 in an unplugged state and outside the target location 60, the mobile computing device 40 is also able to communicate with the flash memory 56 with the server 50 plugged in and/or located within the target location 60.

Figure 3:
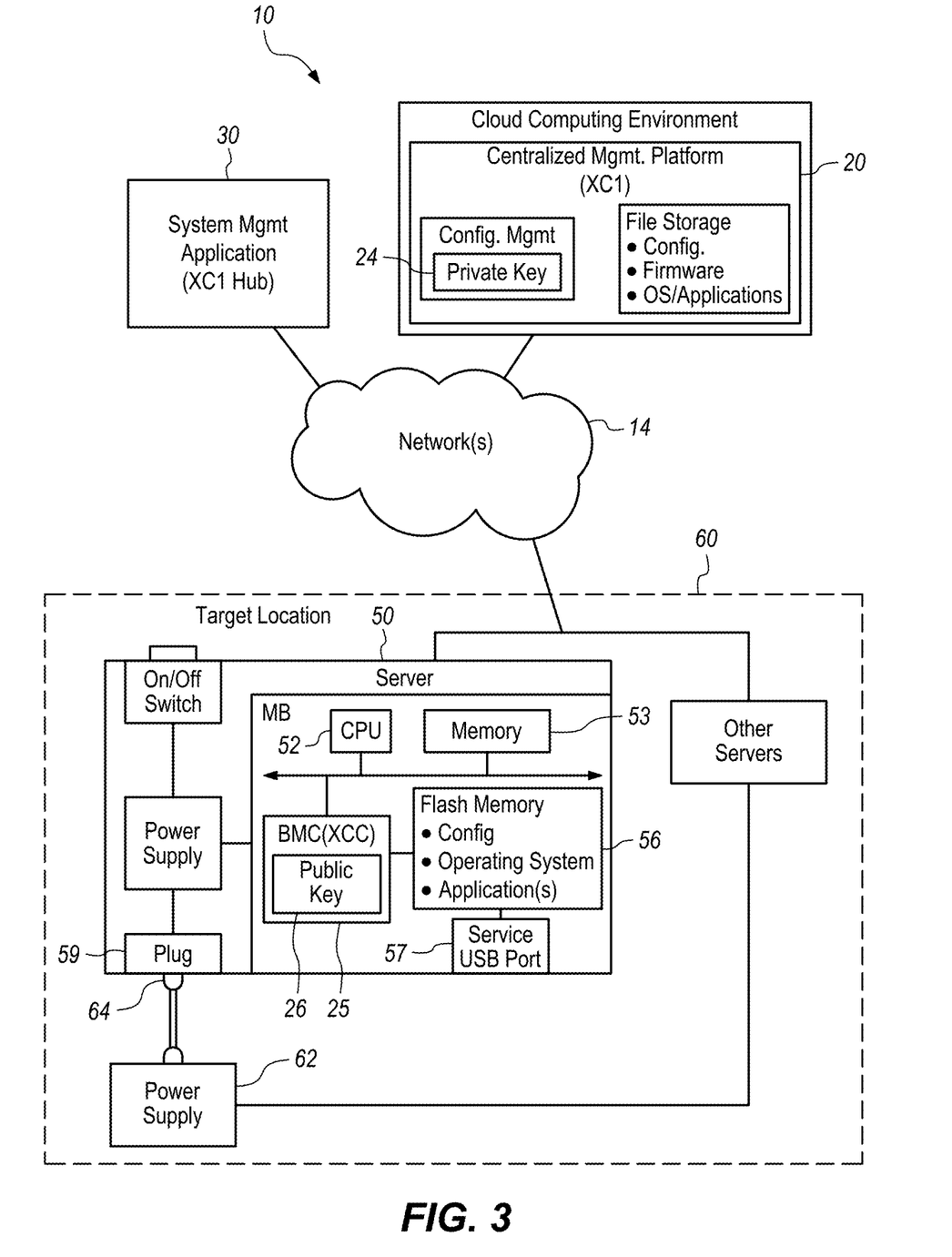
FIG. 3 is a diagram of the system of FIGS. 1-2, after the mobile computing device has been disconnected, the server has been delivered to the target location, and the server is connected to a power source.

FIG. 3 is a diagram of the system 10 of FIGS. 1-2 after the mobile computing device 40 (no longer shown; see FIGS. 1-2) has been disconnected, the server 50 has been delivered to the target location 60, and the server 50 is connected to the power source 62. Note that the power cable 64 connects the power plug 59 to the power source 62 within the target location 60. Accordingly, the server 50 is now in a standby state such that the BMC 55 receives power.

If the configuration data came from the centralized management platform (XC1) 20, then the accompanying digital signature was created with the centralized management platform's private key 24 and the configuration data. Accordingly, the system management controller (BMC) 55 may verify the authenticity of the digital signature using the centralized management platform's public key 26 that was previously provided to the system management controller 55. For example, the system management controller 55 may have obtained the public key 26 from the factory, intermediate points in the supply chain, or the mobile application 42. While the digital signature is used to guarantee that the configuration data was obtained from the trusted centralized management platform 20, the configuration data itself may or may not be encrypted. If the system management controller (XCC) 55 is unable to verify that the source of the configuration file is the centralized management platform 20, then the configuration file should not be used. As previously stated, the XC1 Portal public key may be written to the flash memory or memory accessible to the system management controller (XCC) by the manufacturer or other provider in the server supply chain. Since the XC1 Portal is a cloud service, there may be only one public key that is used by all of the system management controllers (XCCs) in all of the servers.

The following is a non-limiting example of a JWT that includes the configuration data and is signed by the private key:

JWT:
{
   hubIP: . . .
   hubOTT: . . .
   networkConfig: {
     mode: dhcp/static
     ip: . . .
     gw: . . .
     dns: . . .
   }
   osImg: ./linux.iso
   fwImgs: [./xcc.img, uefi.img, . . . ]
}
Signed by XC1 Portal Private Key With the server 50 installed in the target location 60, with connections to both the power source 62 and the network(s) 14, the server 50 is then turned on or powered on, such that the server 50 moves from the standby power state to the power on state. In the power on state, power is supplied to the entire server 50 including the server's central processing unit(s) (CPU) 52, main memory 53, a non-volatile data storage device and one or more firmware chips, such as the basic input-output system (BIOS) chip (not shown). With power now being supplied to the entire server, the system management controller 55 is then able to install the firmware and the operating system on the server. This installation may involve writing the operating system onto the non-volatile data storage device and writing the firmware to the relevant hardware device(s) of the server. The system management controller (XCC) 55 may then connect to the system management application (XC1 Hub) 30 and/or the centralized management platform (XC1 Portal) 20.

Figure 4:
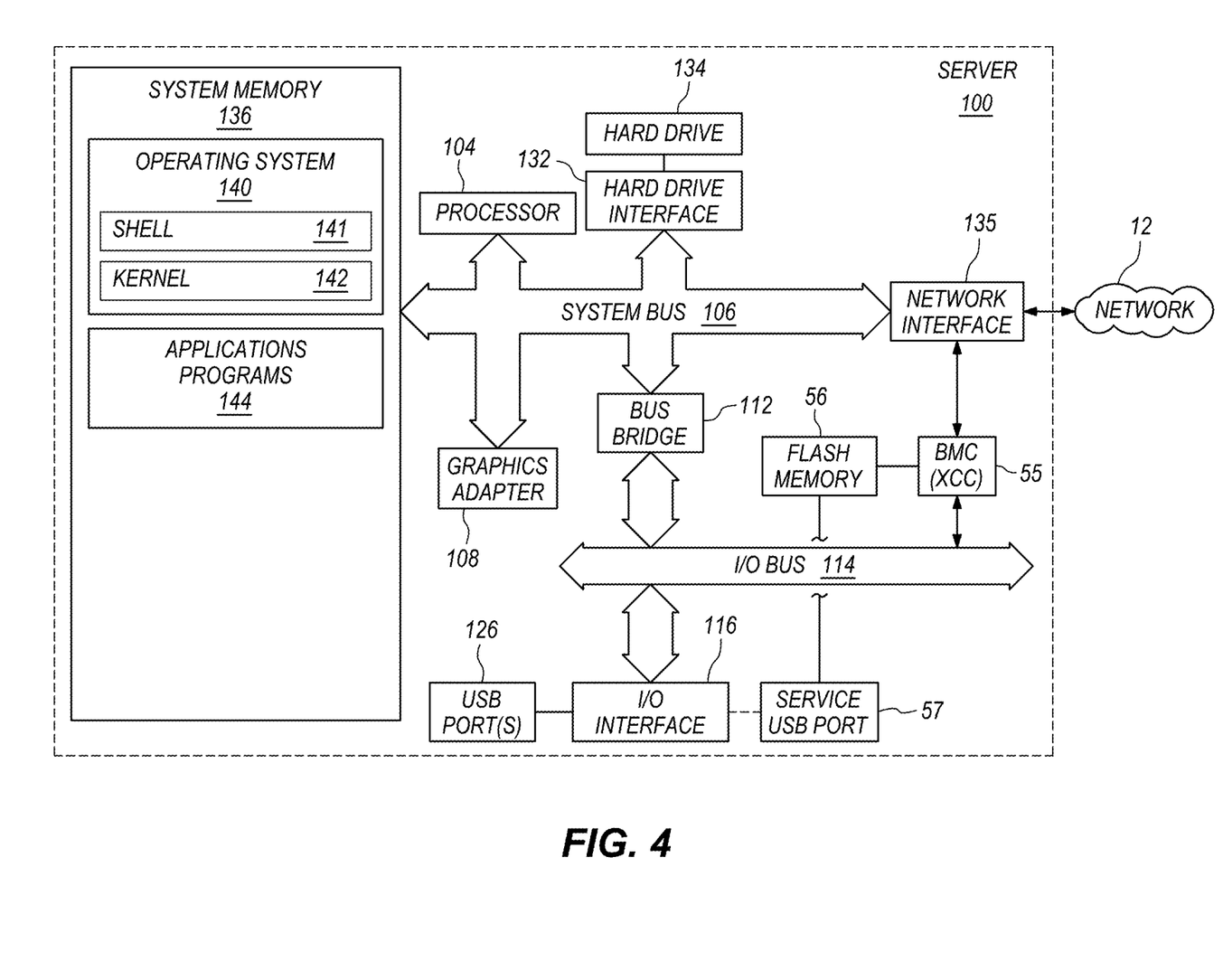
FIG. 4 is a diagram of a server according to some embodiments.

FIG. 4 is a diagram of a computer server 100 that may be representative of the server 50, a system management server hosting the system management application 30, and/or a server forming part of the cloud computing environment 12 shown in FIGS. 1-3. The server 100 includes a processor unit 104 that is coupled to a system bus 106. The processor unit 104 may utilize one or more processors, each of which has one or more processor cores. An optional graphics adapter 108 is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices via USB port(s) 126 and the service USB port 57. As depicted, the computer 100 is able to communicate with other network devices over a network 12 using a network adapter or network interface controller 135.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the server 100 are not intended to be exhaustive, but rather are representative.

The operating system 140 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer server 100 may include application programs 144 stored in the system memory 136.

The server 100 may further include a baseboard management controller (BMC or XCC) 55. The BMC is considered to be an out-of-band controller and may monitor and control various components of the server 100. However, the BMC may also communicate with various devices via the network interface 135 and network(s) 12. The BMC (XCC) 55 is also shown connected to the flash memory 56.

Figure 5:
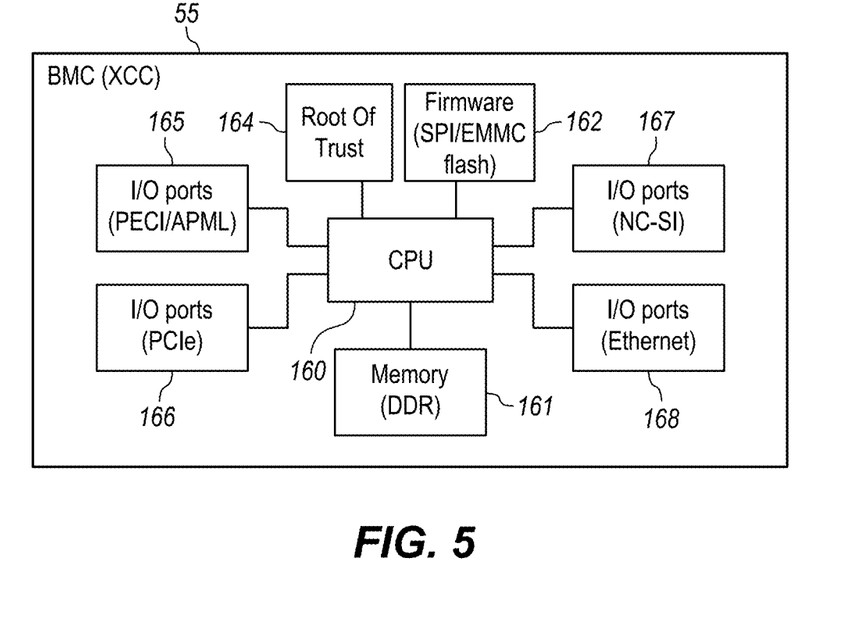
FIG. 5 is a diagram of a baseboard management controller (BMC) according to some embodiments.

FIG. 5 is a diagram of a baseboard management controller (BMC) 55 according to some embodiments. The BMC 55 is similar to a small computer or system on a chip (SoC), including a central processing unit (CPU) 160 (which is a separate entity from the central processing units 52 in FIGS. 1-3 and processor 104 in FIG. 4), memory 161 (such as random-access memory (RAM) on a double data rate (DDR) bus), firmware 162 on a flash memory (such as an embedded multi-media card (eMMC) flash memory or a serial peripheral interface (SPI) flash memory), and a root of trust (RoT) chip 164. The BMC 55 further includes a wide variety of input/output ports. For example, the input/output (I/O) ports may include I/O ports 165 to the hardware components of the server, such as a Platform Environment Control Interface (PECI) port and/or an Advanced Platform Management Link (APML) port; I/O ports 166 to the hardware components of the servers and/or a network interface controller (NIC), such as a Peripheral Component Interconnect Express (PCIe) port; I/O ports 167 to the NIC, such as a network controller sideband interface (NC-SI) port; and I/O ports 168 to a network that accessible to an external user, such as an Ethernet port. The BMC 55 may use any one or more of these I/O ports to interact with hardware devices installed on the server for purposes of monitoring and control.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
   temporarily connecting a mobile computing device to a service input/output port of a server, wherein the service input/output port provides access to a flash memory within the server, and wherein the mobile computing device runs a mobile application;
   the mobile application causing the mobile computing device to write a configuration file, operating system and firmware to the flash memory through the service input/output port;
   a system management controller on the server reading the configuration file from the flash memory with the server in a standby power state or a power on state, wherein the system management controller has access to the flash memory within the server in the standby power state and the power on state; and
   the system management controller using the configuration file and installing the firmware and the operating system on the server with the server in the power on state.

2. The method of claim 1, wherein the service input/output port of the server is a service Universal Serial Bus (USB) port, and wherein a Universal Serial Bus cable is used to connect the mobile computing device to the service USB port.

3. The method of claim 1, wherein the server is in an unplugged state and power is supplied to the flash memory by the mobile computing device connected to the service input/output port of the server.

4. The method of claim 1, wherein the mobile computing device is a smartphone, tablet computer or notebook computer.

5. The method of claim 1, further comprising:
   the mobile application causing the mobile computing device to remove a configuration file, operating system, and/or firmware that was already stored on the flash memory when the mobile computing device was initially connected to the service input/output port of the server.

6. The method of claim 1, further comprising:
   the mobile application retrieving the configuration file, operating system and firmware from a centralized management platform.

7. The method of claim 6, wherein the centralized management platform runs in a cloud computing system and is accessible through a portal over a wide area network.

8. The method of claim 6, wherein the configuration file, operating system and firmware are included in a JavaScript Object Notation web token.

9. The method of claim 8, wherein the JavaScript Object Notation web token is accompanied by a digital signature created using a centralized management platform private key.

10. The method of claim 9, further comprising:
    the centralized management platform forming the JavaScript Object Notation web token with a selected configuration file, operating system and firmware using the centralized management platform private key.

11. The method of claim 9, further comprising:
    the system management controller using a centralized management platform public key that was previously provided to the system management controller to decrypt the digital signature and verify that the JavaScript Object Notation web token was authored by the centralized management platform.

12. The method of claim 1, further comprising:
the mobile application handling the exchange of credentials between the system management controller on the server and a system management application while the server is in an unplugged state, wherein the system management application will monitor the operation of the server after the server has been installed in an operative location.

13. The method of claim 12, wherein the server requires no additional provisioning or configuring at the operative location when the server is installed.

14. The method of claim 12, wherein the configuration file further identifies a second Internet Protocol address for the cloud-based centralized management platform, the method further comprising:
the system management controller using the second Internet Protocol address to communicate with the cloud-based centralized management platform after the server has been installed in an operative location.

15. The method of claim 1, wherein the configuration file identifies a first Internet Protocol address for a system management application, the method further comprising:
the system management controller using the first Internet Protocol address to communicate with the system management application after the server has been installed in an operative location.

16. The method of claim 15, wherein the configuration file includes a security token, credentials, and/or network configuration that enable communication with the system management application.

17. The method of claim 15, wherein the configuration file includes a certified configuration that includes a firmware level and configuration settings for a specific operating system.

18. The method of claim 1, wherein the mobile application causing the mobile computing device to write a configuration file, operating system and firmware to the flash memory through the service input/output port, includes overwriting a default configuration file stored on the flash memory.

19. The method of claim 1, further comprising:
the mobile application causing the mobile computing device to read configuration data that was already stored on the flash memory before connecting the mobile computing device to the service input/output port of the server, wherein the configuration data identifies one or more files that need to be downloaded to the flash memory; and
the mobile application retrieving the one or more files from the centralized management platform and writing the one or more files to the flash memory with the server in the unplugged state.

20. The method of claim 1, further comprising:
the mobile application causing the mobile computing device to read configuration files that were already stored on the flash memory before connecting the mobile computing device to the service input/output port of the server; and
certifying one or more of the configuration files that were already stored on the flash memory.

\* \* \* \* \*